(12) United States Patent
Witzel

(10) Patent No.: US 9,155,113 B2
(45) Date of Patent: Oct. 6, 2015

(54) TERMINATING NOTIFICATION MESSAGE FOR TERMINALS IN A TARGET NETWORK AREA

(75) Inventor: Andreas Witzel, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 238 days.

(21) Appl. No.: 13/416,726

(22) Filed: Mar. 9, 2012

(65) Prior Publication Data

US 2012/0231795 A1 Sep. 13, 2012

Related U.S. Application Data

(60) Provisional application No. 61/453,835, filed on Mar. 11, 2011.

(30) Foreign Application Priority Data

Mar. 11, 2011 (EP) ..................................... 11157839

(51) Int. Cl.
    *H04W 4/00* (2009.01)
    *H04W 76/00* (2009.01)
    *H04W 4/22* (2009.01)

(52) U.S. Cl.
    CPC .............. *H04W 76/007* (2013.01); *H04W 4/22* (2013.01)

(58) Field of Classification Search
    CPC ..... H04W 68/00; H04W 68/005; H04W 4/14; H04W 4/22; H04W 76/007
    USPC .................... 455/404.1, 432.1, 434, 436, 442, 455/456.1–456.3
    See application file for complete search history.

(56) References Cited

U.S. PATENT DOCUMENTS

| 6,745,021 | B1 * | 6/2004 | Stevens ...................... 455/404.1 |
| 7,711,366 | B1 * | 5/2010 | O'Neil et al. ................. 455/438 |
| 7,747,239 | B1 * | 6/2010 | Sennett et al. ............. 455/404.1 |
| 2005/0009508 | A1 * | 1/2005 | Graske et al. .............. 455/414.3 |
| 2006/0285691 | A1 * | 12/2006 | Chin et al. ..................... 380/270 |
| 2007/0135090 | A1 * | 6/2007 | Martin et al. ............. 455/404.2 |
| 2007/0270162 | A1 | 11/2007 | Hampel et al. |
| 2010/0042696 | A1 * | 2/2010 | Vella et al. .................... 709/206 |
| 2011/0183644 | A1 * | 7/2011 | Gupta ......................... 455/404.2 |
| 2012/0191488 | A1 * | 7/2012 | Alperin ............................ 705/5 |
| 2013/0273962 | A1 * | 10/2013 | Phillips et al. ................ 455/521 |
| 2014/0038601 | A1 * | 2/2014 | Gouriou et al. ............ 455/435.1 |
| 2014/0235286 | A1 * | 8/2014 | Song et al. .................... 455/518 |
| 2014/0287767 | A1 * | 9/2014 | Wohlert et al. ............... 455/445 |

FOREIGN PATENT DOCUMENTS

| EP | 1220553 A1 | 7/2002 |
| EP | 1613004 A1 | 1/2006 |
| WO | 9601030 A2 | 1/1996 |

* cited by examiner

*Primary Examiner* — Dai A Phuong
(74) *Attorney, Agent, or Firm* — Coats & Bennett, P.L.L.C.

(57) ABSTRACT

Embodiments herein include a method of notifying terminals located in a target network area. The method is executed by a call control node. The call control node is associated with a serving network area, wherein the serving network area at least partially comprises the target network area. In order to provide an efficient, easily accomplishable, and network capacity sparing notification of terminals located in a target network area, the method comprises receiving a result of a scanning of a visitor location register database associated with the call control node for terminals registered for the target network area, and sending a notification message to the terminals located in the target network area based on the received result of the scanning.

21 Claims, 9 Drawing Sheets

TERMINATING NOTIFICATION MESSAGE FOR TERMINALS IN A TARGET NETWORK AREA

RELATED APPLICATIONS

The present application claims priority under 35 U.S.C. 119(a) to EP 11157839.9, filed Mar. 11, 2011, and under 35 U.S.C. 119(e) to U.S. Provisional Patent App. No. 61/453,835, filed Mar. 17, 2011, each of which is hereby incorporated by reference in its entirety.

TECHNICAL FIELD

The present invention relates to telecommunication, and in particular to a method of notifying terminals located in a target network area, to a call control node for notifying terminals located in a target network area, and a program element.

BACKGROUND

Notifying the general public in a selected area of an approaching emergency event has always been an important issue.

The area of telecommunication offers the possibility to reach a subscriber associated with a terminal via a message. 3rd Generation Partnership Project (3GPP) specifies a "Broadcast"-procedure usable for notifying terminals about an emergency event. Broadcasting makes use of sending a message to terminals in a particular network area via a selected channel. The Broadcast procedure is specified as a Cell Broadcast System (CBS), for example, in 3GPP Technical Specification (TS) 23.041, and is usable in the context of Public Warning Systems (PWS), as specified in 3GPP TS22.268. However, the extension of the target network area to be reached via the broadcast procedure may be selected at call level extension. Further, a message length may be limited owing to the used broadcast channel throughput.

Further, it is known to send a Short Message Service (SMS) to a selected terminal, in order to notify the terminal of an approaching event. In general, sending a SMS is a terminal specific procedure but not dedicated to a selected target network area. Further, the actual location of the terminal has to be permanently tracked for the sending of the SMS.

In order to keep track of the actual location of the terminal, location update signaling sent from a Mobile Switching Center (MSC)/Visitor Location Register (VLR) of a home network to a respective Home Location Register (HLR) may be intercepted, and information about subscribers having roamed into the serving network area of the responsible MSC may be accordingly stored. However, the latter may not allow for actually localizing the terminal within an extension of a serving network area of the MSC, and may thus limit the extension of the target network area to the extension of the serving network area. This problem may even be multiplied in a case in which the MSC may form part of a pool of MSCs.

Further, in order to locate the selected terminal, it may be possible to intercept the signaling at the A-/Iu-interface between a Base Station Subsystem (BSS) and the MSC such that all mobility management procedures executed by all terminals in the serving network area of the MSC are tracked. However, the information about the actual location of all terminals may have to be stored in an external database for a later evaluating. Further, such a monitoring of a movement of a terminal and thus its associated subscriber may be subject to a governmental authorization, which may be legally prohibited in a large number of countries, as it is the case in Germany.

It is also known to use a Customized Applications for Mobile networks Enhanced Logic (CAMEL) "MM Notify" procedure executed by the VLR when a respective MSC receives location update signaling traffic from the selected terminal, and to store the information about the actual location of the terminals. However, this continuous tracking of a location of terminals in the serving network area may require additional effort. Further, the terminals to be tracked may have to be subscribed to this procedure, which may add a lot of signaling traffic even if no SMS may have to be sent to the terminals.

Accordingly, the above described techniques for notifying terminals in a target network area may require additional effort, hardware or signaling traffic within the network, but may comprise a low geographical precision concerning the actual location of the terminal, and may cause legal problems.

SUMMARY

It may be an object of the present invention to provide an efficient, easily accomplishable, and network capacity sparing notification of terminals located in a target network area.

The object defined above is solved by a method of notifying terminals located in a target network area, a call control node for notifying terminals located in a target network area, and a program element according to the independent claims.

According to an exemplary aspect of the invention, a method of notifying terminals located in a target network area is provided. The method is executed by a call control node. The call control node is associated with a serving network area, and the serving network area at least partially comprises the target network area. The method comprises receiving a result of a scanning of a visitor location register database associated with the call control node for terminals registered for the target network area. The method comprises sending a notification message to the terminals located in the target network area based on the received result of the scanning.

According to another exemplary aspect of the invention, a call control node for notifying terminals located in a target network area is provided. The call control node is associated with a serving network area, and the serving network area at least partially comprises the target network area. The call control node comprises a receiving unit configured for receiving a result of a scanning of a visitor location register database associated with the call control node for terminals registered for the target network area. The call control node comprises a sending unit configured for sending a notification message to the terminals located in the target network area based on the received result of the scanning.

A method of a terminal located in a target network area being notified is provided. The method is executed by the terminal. The target network area is at least partially comprised in a serving network area associated with a call control node. The method comprises receiving a notification message based on the call control node receiving a result of a scanning of a visitor location register database associated with the call control node for terminals registered for the target network area.

A terminal for being notified is provided. The terminal is located in a target network area, and the target network area is at least partially comprised in a serving network area associated with a call control node. The terminal comprises a receiving unit configured for receiving a notification message based on the call control node receiving a result of a scanning of a visitor location register database associated with the call control node for terminals registered for the target network area.

According to another exemplary aspect of the invention, a program element is provided. The program element, when being executed by a processor, is configured to carry out or control a method of notifying terminals located in a target network area as described above.

A computer-readable medium is provided. In the computer-readable medium a computer program for notifying terminals located in a target network area is stored. The computer program, when being executed by a processor, is configured to carry out or control a method of notifying terminals located in a target network area as described above.

Within the context of the present application, the term "serving network area" of a call control node may particularly denote a network area for which the call control node may be responsible as to call control management, mobility management, storage of a visitor location register database record, and provision of a radio access for terminals registered for (a network area of) the serving network area.

The term "the serving network area at least partially comprises the target network area" may particularly denote that the target network area may form part of the serving network area of a call control node, and optionally may form part of another serving network area of another call control node. In particular, an extension of the target network area may be smaller or may be identical to an extension of the serving network area of the call control node and/or an extension of the another serving network area of the another call control node.

The term "a terminal being registered in a visitor location register database for the target network area" may particularly denote that the terminal may have sent his subscriber information to the visitor location register database when being located and being attached in the target network area to a call control node associated with the serving network area. Here, the visitor location register database may act as a central database for all terminals attached to the call control node. In particular, a location of a registered terminal comprising an established call may be known at cell level, and a location of an idle terminal may be known at location area level.

According to the exemplary aspects of the invention, a call control node of a communication network may be provided with a messaging function usable for notifying terminals located in a particular geographical area, namely the target network area, about events. To this end, the call control node may deliver notification messages to terminals in the target network area such that subscribers associated with the terminals may be informed about the event. In particular, one or more subscribers may be associated with one terminal or with more terminals. In order to locate the terminals in the target network area, the call control node may receive a result of the scanning of and executed by the visitor location register database such that the call control node may gain the required location information about the terminals having been registered for the target network area and whose registration information have been stored in the visitor location register database.

Thus, a plurality of terminals may be notified at once although a point-to-point messaging function may be employed.

Further, since the sending of the notification message to the terminals may be based on the scanning of the visitor location registered database but not on tracking a location of all individual terminals in the target network area, the notification of the terminals may be executed efficiently and also cost-effective.

Further, since a visitor location register database may be scanned for identifying the terminals located in the target network area, the notification of the terminals may not involve additional signaling traffic for tracking an actual position of the terminals, thereby the notification of the terminals being network capacity saving.

Further, the notification of the terminals may represent a spatially precise technique, since in the visitor location register database information about the actual location of all registered terminals may be stored.

Further, since an already available record of the terminals may be used for the notification of the terminals, legal problems with tracking the actual location of the terminals may be omitted.

Next, further exemplary embodiments of the method of notifying terminals located in a target network area will be explained. However, these embodiments also apply to the call control node, the method of a terminal located in a target network area being notified, the terminal, the program element, and the computer-readable medium.

The method may further comprise determining whether a registered terminal may have been handed-over from the target network area to another network area, wherein the sending may comprise sending the notification message if the registered terminal may be located in the target network area, particularly if the registered terminal may have not been handed-over from the target network area to the another network area. In particular, the another network area may be comprised in the serving network area of the call control node or may be comprised in another serving network area of another call control node. Accordingly, only those registered terminals which may still reside in the network area may be notified by a received notification message. Thus, the notification may omit unneeded signaling traffic between terminals having been handed over out of the target network area and the call control node.

In particular, determining whether a registered terminal may have been handed-over from the target network area to another network area may comprises determining whether an established call may be present for the registered terminal, and, if an established call may be present, investigating handover-related signaling of the registered terminal for determining the location of the terminal.

In particular, in a case in which a terminal having been located in the target network area may currently roam out of the target network area to another network area of the serving network area of the call control node, the notification message may be sent to the terminal. The latter may be acceptable, since a respective network load may be low.

In particular, in a case in which a terminal having been located in the target network area may currently roam out of the target network area to another serving network area, the notification message may be not be sent to the terminal at all, thereby avoiding any disturbances of a subscriber of the terminal.

The method may further comprise scanning established calls in the serving network area of the call control node for a terminal having been handed over into the target network area, wherein the sending may comprise sending the notification message based on a result of the scanning. This measure may allow for notifying all terminals located in the target network area despite a missing registration in the visitor location register database for the target network area.

In particular, the scanning of the incoming and out-going established calls may be simultaneously executed.

The scanning of the established calls may comprise scanning the established calls in the serving network area of the call control node for a terminal having been handed over into the target network area from another network area in the serving network area of the call control node. In particular, in this case, the call control node may act as a anchor call control node, and may comprise responsibility for the call control node concerning to the mobility management, the call control management, the storage of the visitor location register database record, and the provision of a radio access for the communication. Further, the terminal being identified or found by this measure may have executed an intra-call control node handover from a network area of the serving network areas associated with the call control node and another different network area of the serving network area.

The scanning of the established calls may comprise scanning the established calls in the serving network area of the call control node for terminals having been handed over into the target network area from another serving network area of another call control node. In particular, the call control node executing the method may act as a non-anchor call control node which may be not responsible for the terminal as to call control management, mobility management, and storage of the visitor location registration database record but may only provide the radio access. Further, the terminal may have executed an inter-call control node handover from one call control node to another call control node. Accordingly, this measure may represent an efficient technique to identify terminals which may be registered in a visitor location registered database associated with another call control node but not the call control node executing the method.

In particular, the scanning of the established calls may comprise investigating signaling traffic between the call control node and the terminal related to the inter- or intra-call control node handover, respectively, in order to determine the location of the respective terminals.

The method may further comprise receiving the notification message from another call control node for the sending of the notification message to the terminals. Accordingly, the call control node may be configured for relaying or forwarding the notification message from another call control node to the terminal located in the target network area. This measure may represent a simple technique for identifying and locating terminals for which the call control node may act as non-anchor call control node.

The receiving of the notification message from the another call control node may comprise receiving the notification message from the another call control node in response to the another call control node receiving the notification message from a notification center node. Thus, the notification center node may not need to be aware of a network distribution between the call control nodes residing in the network, thereby saving storage capacity of the notification center node. In particular, each of the call control nodes may determine whether the call control node may be responsible for the target area, and may otherwise discard the notification message. The term "responsible for the target network area" may particularly denote acting as anchor and non-anchor call control node for a terminal located in the target network area.

In particular, the notification center node may generate the notification message, and may dispatch the notification message to a plurality of call control nodes comprising at least the call control node and the another call control node (or to all available call control nodes in the network). Accordingly, even if the another call control node may not be responsible for the target network area, and may act as anchor-call control node for a terminal located in the target network area, the particular terminal may be instantly notified by the call control node.

The method may further comprise sending, to the another call control node, to an interface node located between the call control node and the another call control node or to a notification message delivery node, request information indicating a request for generating a notification message for the sending of the notification message, wherein the receiving of the notification message from the another call control node may comprise receiving the notification message from the another call control node in response to the sending of the request information. Accordingly, in a case in which the call control node may act as the non-anchor call control node for a terminal located in the target network area, the another anchor-call control node may be informed about the delivery of the notification message to be sent to the terminals.

In particular, the notification message delivery node and the interface node may be configured for relaying the request information to the another call control node particularly in a transparent way.

In particular, the another call control node may generate the notification message based on the received request information.

In particular, the call control node may receive the notification message from the another call control node in a transparent way, particularly being not aware about the content of the notification message.

The method may further comprise sending the notification message to a notification message delivery node for the sending of the notification message to the terminals. In particular, the latter measure may apply for the call control node acting as non-anchor and/or as anchor-call control node. Accordingly, the notification message delivery node may take care of the delivery of the notification message, thereby employing conventional techniques of transferring messages to a terminal. Further, this measure may be also network capacity saving, since the call control node may only be involved once in the sending of the notification message. Further, in a case in which the notification center node may not be able to send or may belatedly send the notification message, for example owing to a high network load, the notification message may be stored in the notification message delivery node for a later sending.

The method may further comprise receiving the notification message from a notification center node for the sending of the notification message to the terminals located in the target network area. In particular, the notification message may have been sent only to the call control node or to the plurality of call control nodes as described above. In particular the notification center node may comprise a mapping table, in order to identify a responsibility call control node for the target network area. In particular, the mapping table may be configured by the operation and make maintenance (O & M) node.

In particular, the notification message may be sent to the call control node of the plurality of call control nodes via a central interface node which in turn relays the notification message such that the notification center node may not be aware of the architecture of the network.

The method may further comprise receiving from a notification center node time period information indicating a time period during which the notification message may to be sent to the terminals, wherein the sending of the notification message may comprise sending the notification message within the indicated time period. The time period information may be included in the notification message received from the notification center node or may be sent in a separate message. This measure may account for terminals having roamed or having been handed-over into the target network area after the executed scanning of the visitor location registered database and/or the scanning of the established calls, since the content of the notification message may be relevant for the terminals located in the target network area for a longer time duration.

In particular, the call control node may monitor for terminals having been handed-over or having been roamed into the target network area particularly be investigating (inter- and/or inter-) handover-related signaling and location update signaling, respectively between the involved terminal and the call control node.

The notification message may comprise location area information indicating a location area of a terminal (particularly geographical information such as location Area Identity (LAI)), and notification text information indicating a notification text to be provided with a terminal, and optionally at least one of filter information to be used by a terminal for filtering the notification message to be provided with a subscriber associated with the terminal, and time period information indicating a time period during which the notification message may have to be sent to the terminal located in the target network area. In particular, the time period information may be identical to the time period information described above. In particular, the filter information may enable the terminal for filtering the received notification message, and to determine whether to provide the notification message with the subscriber. Such filter information may comprise use status of the terminal (for example, handheld-terminal, in-car-equipment-terminal, machine to machine communication-terminal).

In particular, providing the notification message with the subscriber may comprise displaying the notification message to the subscriber or acoustically altering the subscriber.

In particular, in a case in which the terminal may be configured as a smart phone comprising navigation support, providing the notification message with the subscriber may comprise displaying a location to which the notification may refer on a map based on the received location area information, particularly based on the received geographical information or coordinates.

The notification message may comprise information about an emergency, information about an advertisement, or service related information. Accordingly, the notification message may be regarded as a terminating messaging function informing terminals in a particular target network area about an approaching emergency or catastrophe, about a localized advertisement or about a geographically available service.

In particular, the notification message may be configured as a Short Message Service (SMS) or an Unstructured Supplementary Service Data (USSD). In particular, receipt of a SMS message by a terminal may immediately trigger an alert of the terminal, thereby omitting time losses between the receipt of the SMS and the alert of the subscriber which may be particularly beneficial in a case of an emergency notification.

In particular, the received notification message may not be stored in the terminal such that a later provision of the notification message may not cause confusion.

In particular, the notification message may be sent via SS7/MAP and/or may be ASN.1 coded. Alternatively, the notification message may be configured as an Internet Packet (IP) based packet or Hypertext Transfer Protocol (HTTP) based packet containing an Extensible Markup Language (XML) descriptive file.

In particular, the notification message may be classified by a new message type to be recognized by the terminal.

In particular, the sending of the notification message may comprise sending the notification message in a language in accordance with preferences of a subscriber associated with the terminal in the target network area, thereby enabling the subscriber to understand a notification text comprised in the notification message. In particular, the language may be selected by the call control node based on a preferred language of the subscriber, which may be stored in a subscriber record of the visitor location register database and the notification text may be pre-translated and then sent to the terminal. Alternatively, the notification text may be sent in commonly spoken languages, and the terminal may select a respective translation of the notification text.

In particular, the method may comprise reporting to the notification center node at least one of a number of terminals having received notification message, and an identification of the terminals having received the notification message. Thus, the notification center node may be enabled to execute further actions based on the received report.

For example, in a case of an emergency notification, the report may be used to assess whether there may be subscribers in the emergency area, which may have to be evacuated or which may not be able to move (for example, injured, trapped, elderly, handicapped subscribers) and may need rescue. In particular, a 3GPP SMS delivery report mechanism for logging the subscribers having received an emergency SMS may be used. In particular, this report of the subscribers found in the target network area may be used to apply further 3GPP positioning techniques. This more precise location information may be used by rescue forces to focus their activities in the emergency area.

In particular, the call control node may form part of a pool of call control nodes. In particular, the call control node in the Pool may execute the method as described above, in a case in which the call control node may be regarded as an independent node. Alternatively, in a case in which the pool of call control nodes may be addressed by the notification center node, the pool of call control nodes may internally dispatch the received notification message particularly using conventional measures. For example, a mechanism of fetching authentication data from a cooperating visitor location register database (in case of leaving a call control node the pool) by requesting the authentication data from anyone visitor location register database in the pool, the receiving visitor location register database forwarding the request to the remaining pool members and a responsible visitor location register database directly replying may be used.

In particular, the call control node may be configured as a Mobile Switching Center (MSC), and the visitor location register database may be configured as Visitor Location Register (VLR) which may be accessible using an International Mobile Subscriber Identity (IMSI). In particular, the notification center may be configured as Emergency Center, and the notification message delivery node may be configured as SMS-Service Center (SMS-SC). In particular, the central interface node may be configured as Public Mobile Land Network (PLMN) Interface, and the interface node interfacing two call control nodes may be configured as an E-interface.

In particular, the VLR may be co-located to or may integrated in the MSC.

BRIEF DESCRIPTION OF THE DRAWINGS

Embodiments of the invention will be described in more detail hereinafter with reference to examples but to which the scope of the invention is not limited.

DETAILED DESCRIPTION

Figure 1:
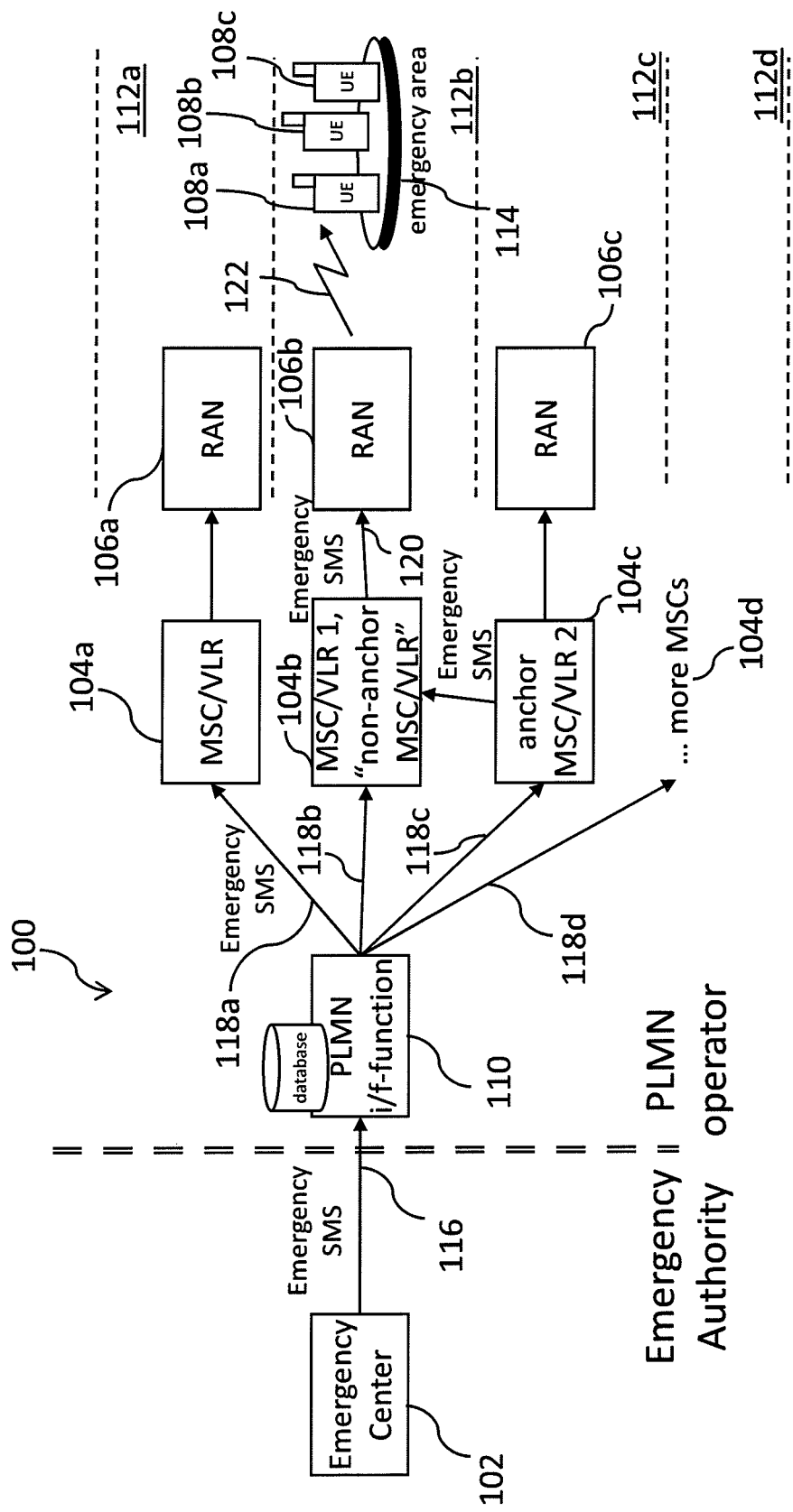
FIG. 1 is a block diagram illustrating a communication system for notifying terminals located in an emergency area.

The illustrations in the drawings are schematic. In different drawings, similar or identical elements or steps are provided with the same reference signs.

Referring to FIG. 1, a communication system 100 is illustrated. The communication system 100 comprises an emergency center 102, a plurality of call control nodes 104a-d configured as Mobile Switching Center-Servers (MSCs), a plurality of Radio Access Networks (RANs) 106a-c, and a plurality of terminals 108a-c. A Public Land Mobile Network (PLMN) interfacing function 110 interfaces the emergency center 102 and the plurality of MSCs 104a-c. In the following, the PLMN interfacing function 110 will be referred to as the PLMN interface 110. Each of the MSCs 104a-d is co-located with a Visitor Location Register (VLR). For sake of simplicity, each of the MSCs 104a-d and the respective co-located VLR 104a-d is referenced using a common reference numeral. Further, each of the MSCs/VLRs 104a-d is associated with a serving network area 112a-d for which the MSC 104a-d is responsible for terminals as to call control management, mobility management, storage of the VLR record, and provision of the radio access for communication. An E-interface node interfaces a MSC 104a-d and another different one MSC 104a-d. The terminals 108a-c are located in an emergency area 114 forming part of the serving network area 112b associated with the MSC 104b.

The terminal 108a has an established call. The terminal 108b has executed an intra-MSC handover from a network area which forms part of the serving network area 112b but is distinct from the emergency area 114 into the emergency area 114. Further, the terminal 108c has executed an inter-MSC handover from a network area which forms part of the serving network area 112c associated with the MSC 104c into the emergency area 114 of the serving area 112b of the MSC 104b.

In the following, it is assumed that a tsunami will soon occur in the emergency area 114. In order to notify the terminals 108a-c located in the emergency area 114, a SMS based emergency data transfer between the emergency center 102 and the terminals 108a-c located in the emergency area 114 via the plurality of MSC/VLR 104a-c is enabled.

To this end, the emergency center 102 is configured for generating a terminating emergency SMS and for sending the emergency SMS to the PLMN-interface 110. Further, the PLMN interface 110 is configured for sending the emergency SMS upon receipt to all MSC 104a-d located in the communication network 100. The emergency SMS transfer between the emergency center 102 and the PLMN interface 110 is indicated by an arrow 116, and the emergency SMS transfer between the PLMN interface 110 and the plurality of MSC 104a-d is indicated by arrows 118a-d. The MSC 104b is configured for relaying the emergency SMS to all terminals locating in the emergency area 114 which are registered in the VLR 104b for the emergency area 114 and which have not executed an handover out of the emergency area 114 and to terminals which have executed an handover into the emergency area 114 from another network area forming part of the serving network area 112b. In the shown embodiment, this is the case for the terminals 108a, b. A respective emergency SMS transfer between the MSC 104b and the RAN 106b is indicated by an arrow 120, and the emergency SMS transfer between the RAN 106b and the terminals 108a, b is indicated by an arrow 122. Further, the MSC 104c is configured for sending an emergency SMS to the MSC 104b upon receipt of the emergency SMS from the emergency center 102 for the terminal 108c having been handed-over into the emergency area 114 from the serving network area 114c associated with the MSC 104c. A respective emergency SMS data transfer is indicated by an arrow 124. Accordingly, the MSC 104b is configured for relaying the received emergency SMS to the terminal 108c located in the emergency area 114.

It is noted that the communication system 100 comprises four MSCs 104a-d and three terminals 108a-c located in the emergency area 114. However, the communication system 100 may comprise between one MSC and N MSCs (N equals to at least one), and between zero and M terminals (M equals to at least zero).

Figure 2:
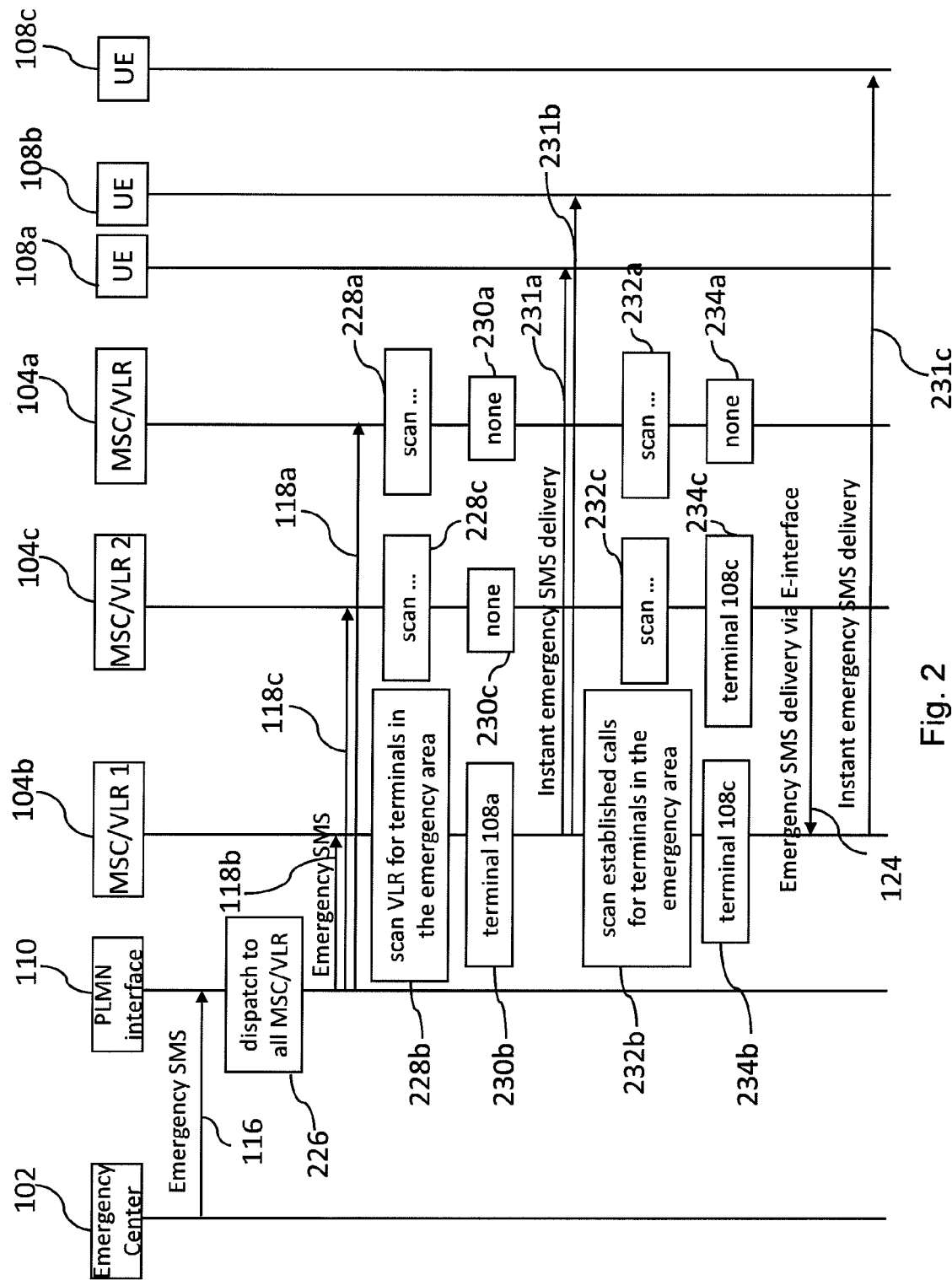
FIG. 2 is a flow diagram illustrating a method of notifying terminals located in an emergency area according to an exemplary embodiment of the invention.
Figure 3:
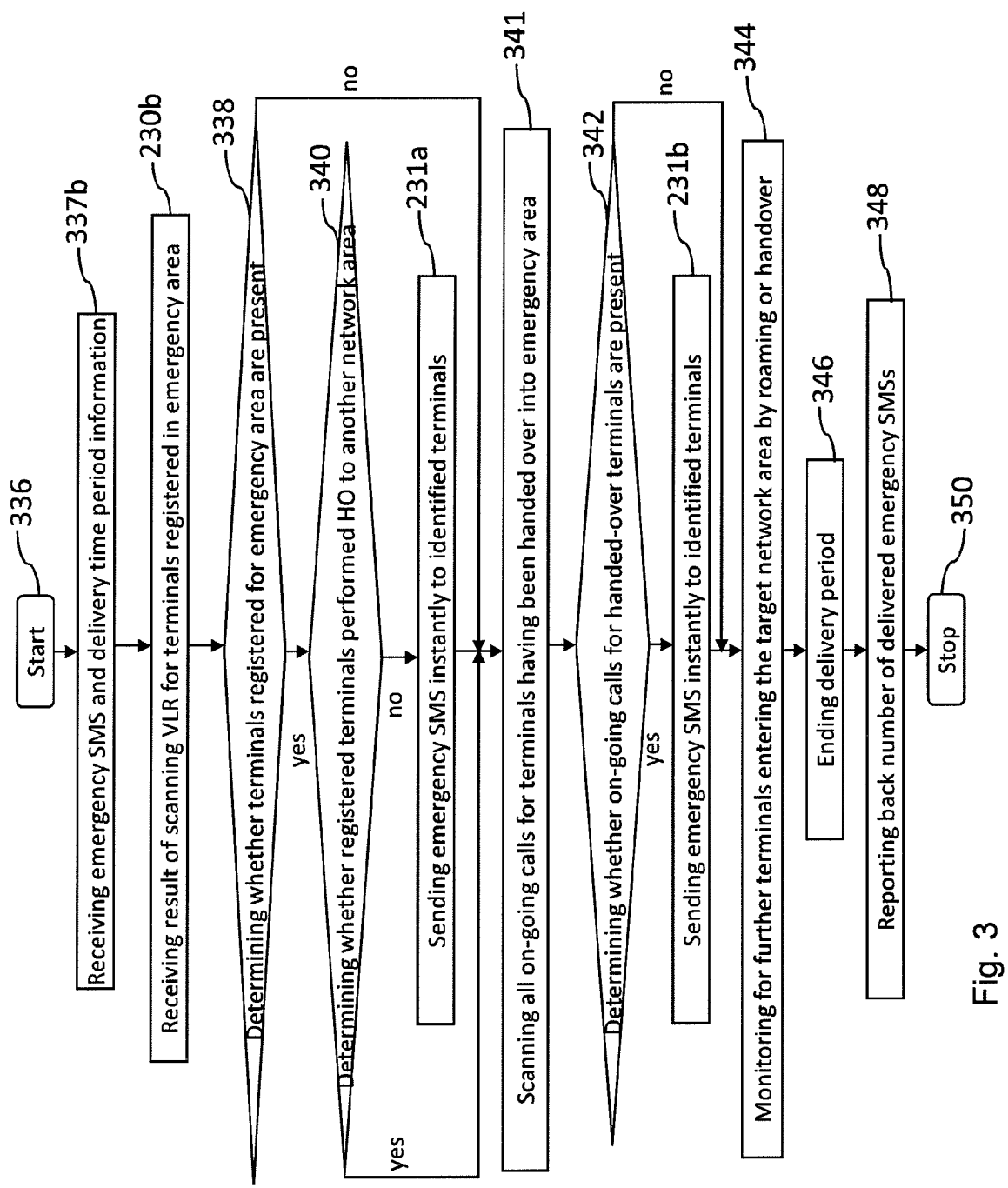
FIG. 3 is a flow diagram illustrating the method of notifying terminals located in the emergency area in FIG. 2 from a perspective of a MSC of the communication system in FIG. 1.

Referring to FIGS. 2 and 3, a method of notifying the terminals 108a-c located in the emergency area 114 according to an exemplary embodiment of the invention will be explained in the following. FIG. 2 focuses on the intra-MSC handover case of the terminal 108c, and FIG. 3 focuses on the inter-MSC handover case of the terminal 108b. For ease of explanation, reference numerals assigned to the emergency SMS data transfer between the emergency center 102 and the terminals 108a-c will be used for referring to respective method steps of the method. Further, the MSC 104d is omitted.

In a first step 116, the emergency center 102 sends the emergency SMS to the PLMN interface 110. The emergency SMS comprises time period information about a time period in which the emergency SMS shall be delivered to the terminals. The emergency SMS is transparent to each of the receiving nodes in a transfer path of the emergency SMS except for the MSCs 104a-d. The MSCs 104a-d are configured for interpreting the time period information. Hence, the emergency SMS is semi-transparent for the MSCs 104a-d. After expiring of the time period, the emergency SMS is discarded by the MSCs 104a-d, and the emergency SMS will not be sent to the terminals 108a-d.

Next, in a step 226, the PLMN interface 110 determines to dispatch the emergency SMS to all MSC/VLR 104a-d forming part of the communication system 100. The determination is based on the fact that the PLMN interface 110 is not aware of the geographical distribution of the MSC/VLRs 104a-d within the communication network 100. Accordingly, the PLMN interface 110 is not able to forward the received emergency SMS to the MSC 104b responsible for the emergency area 114. Afterwards, in the steps 118a-d, the PLMN interface 110 sends the emergency SMS to each of the MSC 104*b-d*. Thereupon, each of the MSC 104*b-d* scans its associated VLR for terminals located in the emergency area 114. In the shown embodiment of the communication system of FIG. 1, the MSC 104*b* identifies the terminal 108*a*, since this terminal 108*a* has been registered for the emergency area 114 in the VLR 104*b* of the MSC 104*b*. The scanning of the VLRs 104*a, c* associated with the MSCs 104*a, c* results in no terminals being registered for the emergency area 114.

Afterwards, the MSC 104*b* determines whether the identified terminal 108*a* has executed an handover out of the emergency area 114 by checking whether a call is present for the terminal 108*a*, and whether hand-over related signaling for the terminal 108*a* is found. The determination results in that the terminal 108*a* is still located in the emergency area 114. In a step 231*a*, the MSC 104*b* instantly sends the emergency SMS to the terminal 108*a*. It is noted that the emergency SMS transfer indicated by the reference numeral 231 comprises the emergency SMS transfer indicated in FIG. 1 by the reference numerals 120 and 122.

Further, the MSC 104*b* executes an intra-MSC handover check which will be explained with reference to FIG. 3. This intra-MSC handover check results in the identification of the terminal 108*b*, and, in a step 231*b*, the MSC 104*b* instantly sends the emergency SMS to the terminal 108*b*.

In a step 232*a-c*, each of the MSC 104*b-d* scans all calls established for terminals located in the emergency area 114, in order to identify these terminals having been handed over into the respective serving network area 112*a-c* from another serving network area 114*a-c* of another MSC 104*a-c*. Here, all handover related messages between the terminals and the anchor and non-anchor MSCs are investigated. Accordingly, a terminal having an established call with one MSC and moving into the serving network area of another MSC will be identified twice. In a step 234*a-c*, the MSCs 104*b, c* identify the terminal 108*c*, and the MSC 104*a* concludes that no call is established for a terminal located in the emergency area 114 and being registered for the serving network area 114*a*. Accordingly, in a step 124, the MSC 104*c* sends the emergency SMS to the MSC 104*b* via the E-interface for terminals having executed an intra-MSC handover. In the step 120*c*, the MSC 104*c* instantly relays the emergency SMS to the terminal 108*c*.

Next, each of the terminals 108*a-c* sends an acknowledgment indicating a receipt of the emergency SMS to the MSC 104*b* which in turn sends a logging report to the emergency center 102 comprising information about a number of terminals 108*a-c* having received the emergency SMS.

At least two of the step 228 of the scanning the VLR 104*a-c*, the step of scanning the established calls for terminals having executed an intra-MSC handover by the MSC 104*b*, and the step 232 of the scanning of the established calls for terminals having executed an inter-MSC handover may be simultaneously executed. Further, the scanning of the established calls for terminals having executed an intra-MSC handover may be executed by all MSCs 104*a-c*. However, it is preferred that only the MSC 104*b* executed this step, in order to save processing resources of the MSCs 104*a, c*.

Further, the step 232*b* of the scanning of the established calls by the MSC 104*b* for terminals having executed an inter-MSC handover may be omitted if all other MSCs 104*b, c* in the communication network 100 execute the scanning step 232. In this case, the respective terminal 108*c* may be (only) identified by the anchor MSC 104*c*.

It is noted that the delivery of the emergency SMS makes use of existing procedures in the MSC 104*a-d* of sending a terminating SMS to a terminal. For example, if a terminal is detached or may not be reached by paging, the emergency SMS delivery will be discarded. The latter option may be reasonable assuming that a delivery of the emergency SMS would not be meaningful in this case.

Referring to FIG. 3, the method of notifying the terminals 108*a-c* located in the emergency area 114 is explained from a perspective of the MSC 104*b*.

In a first step 336, the method starts. Next, the MSC 104*b* receives in a step 337 the emergency SMS and the respective time period information as to the delivery of the emergency SMS to the terminals 108*a-c*. It is noted that the step 337 comprises the steps 116 and 118*b*. The MSC 104*b* initiates a timer to count until an expiration of the time period indicated by the time period information.

Next, in a step 230*b*, the MSC 104*b* receives a result of a scanning of the VLR 104*b* associated with the MSC 104*b* for terminals being registered in the VLR 104*b* for the emergency area 114. This result is configured as a table having an entry for the terminal 108*a*. Next, in a step 338, the MSC 104*b* determines whether terminals registered for the emergency area 114 are present in the table. If the determination is in the affirmative (as it is for the terminal 108*a*), the MSC 104*b* determines in a step 340 whether the registered terminal 108*a* has executed a handover to another network area, for example of the serving network area 112*b* associated with the MSC 104*b* or of another serving network area 112*a, c* associated with the MSCs 104*a, c*. If the determination is not in the affirmative, the MSC 104*b* sends the emergency SMS instantly to the identified terminal 108*a* in the step 231*a*.

Next, in the step 341, the MSC 104*b* scans all established calls for terminals having been handed over into the emergency area 114 from another network area of the serving network area 114*b* associated with the MSC 104*b*. This step 341 is also executed in the cases in which the determination of the step 338 is not in the affirmative and/or the determination of the step 340 is in the affirmative. Here, the scanning results in a respective table comprising an entry for the terminal 108*b*.

Next, in a step 342, the MSC 104*b* determines whether established calls for these handed-over terminals are present by evaluating the table. If the determination is in the affirmative, the MSC 104*b* instantly sends the emergency SMS in the step 231*b* to the found terminals (as it is the case for the terminal 108*b*).

Next, the MSC 104*b* monitors in a step 344 for further terminals entering the emergency area 114 either by roaming or by executing a handover. This monitoring is also executed if the determination of the step 342 is not in the affirmative. In a case of a roaming terminal, the MSC 104*b* evaluates location update related signaling traffic between the terminal and the MSC 104*b*, and in a case of an handed-over terminal, the MSC 104*b* evaluates hand-over related signaling between the terminal and the MSC 104*b*.

Next, the MSC 104*b* evaluates in a step 346 that the delivery time period ends, since the timer set in the MSC 104*b* has expired. Next, in a step 348, the MSC 104*b* reports back the number of delivered emergency SMSs by evaluating the received acknowledgments of the terminals 108*a-c*. The method then stops in a step 350.

The steps 232, 234 of FIG. 2 are executed between the step 120*b* and the step 344 and in a case in which the determination of the step 342 is not in the affirmative, in order to determine inter-MSC handed-over terminals (such as the terminal 108*c*).

Figure 4:
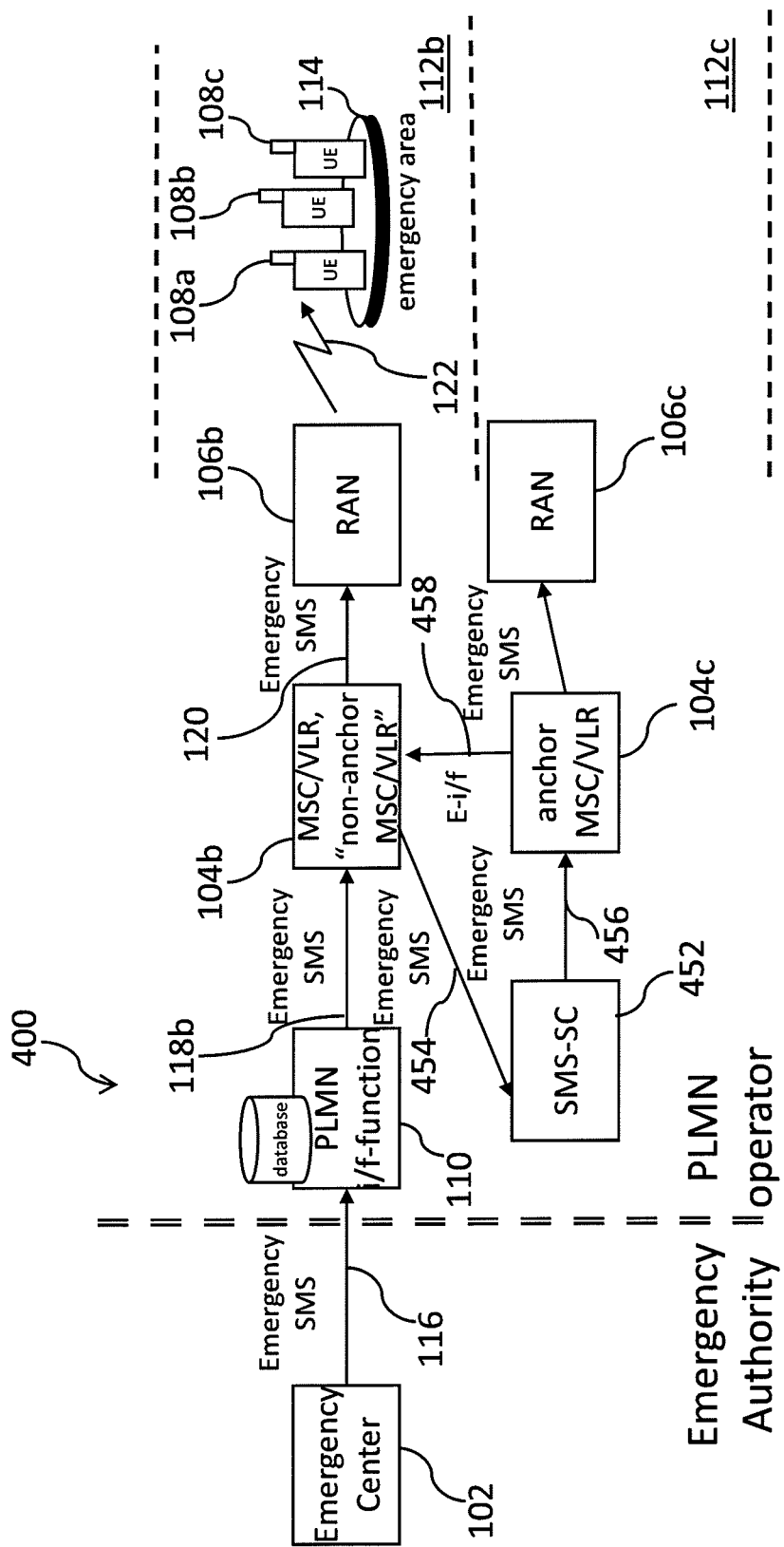
FIG. 4 is a block diagram illustrating a communication system for notifying terminals located in an emergency area.

Referring to FIG. 4, a communication system 400 is illustrated. The communication system 400 is identical to the communication system 100. However, the communication system 400 comprises a SMS-SC 452. For simplicity, the MSCs 104a, d, the RAN 106a and the serving network areas 112a, d are omitted.

Similarly to the description of FIGS. 1 to 3, it is assumed in the following that a tsunami will soon occur in the emergency area 114. In order to notify the terminals 108a-c located in the emergency area 114, a SMS based emergency data transfer between the emergency center 102 and the terminals 108a-c located in the emergency area 114 via the MSC/VLR 104b is enabled.

In this embodiment, the PLMN interface 110 is configured for sending the emergency SMS 118b directly to the MSC 104b, since the PLMN interface 110 comprises a respective table with entries for a network distribution of the communication system 400 concerning the MSCs 104a-d. For the delivery of the emergency SMS to the terminal 108c having executed the inter-MSC handover, the MSC 104b is configured for sending the emergency SMS to the SMS-SC 452 which is configured for relaying the emergency SMS to the MSC 104c acting as the anchor MSC for the terminal 108c. The MSC 104c is configured for sending the emergency SMS back to the MSC 104b for the sending of the emergency SMS to the terminal 108c. The emergency SMS transfer between the MSC 104b and the SMS-SC 452 is indicated by an arrow 454, the emergency SMS transfer between the SMS-SC 452 and the MSC 104c is indicated by an arrow 456, and the emergency SMS transfer between MSC 104c and the MSC 104b is indicated by an arrow 458.

Figure 5:
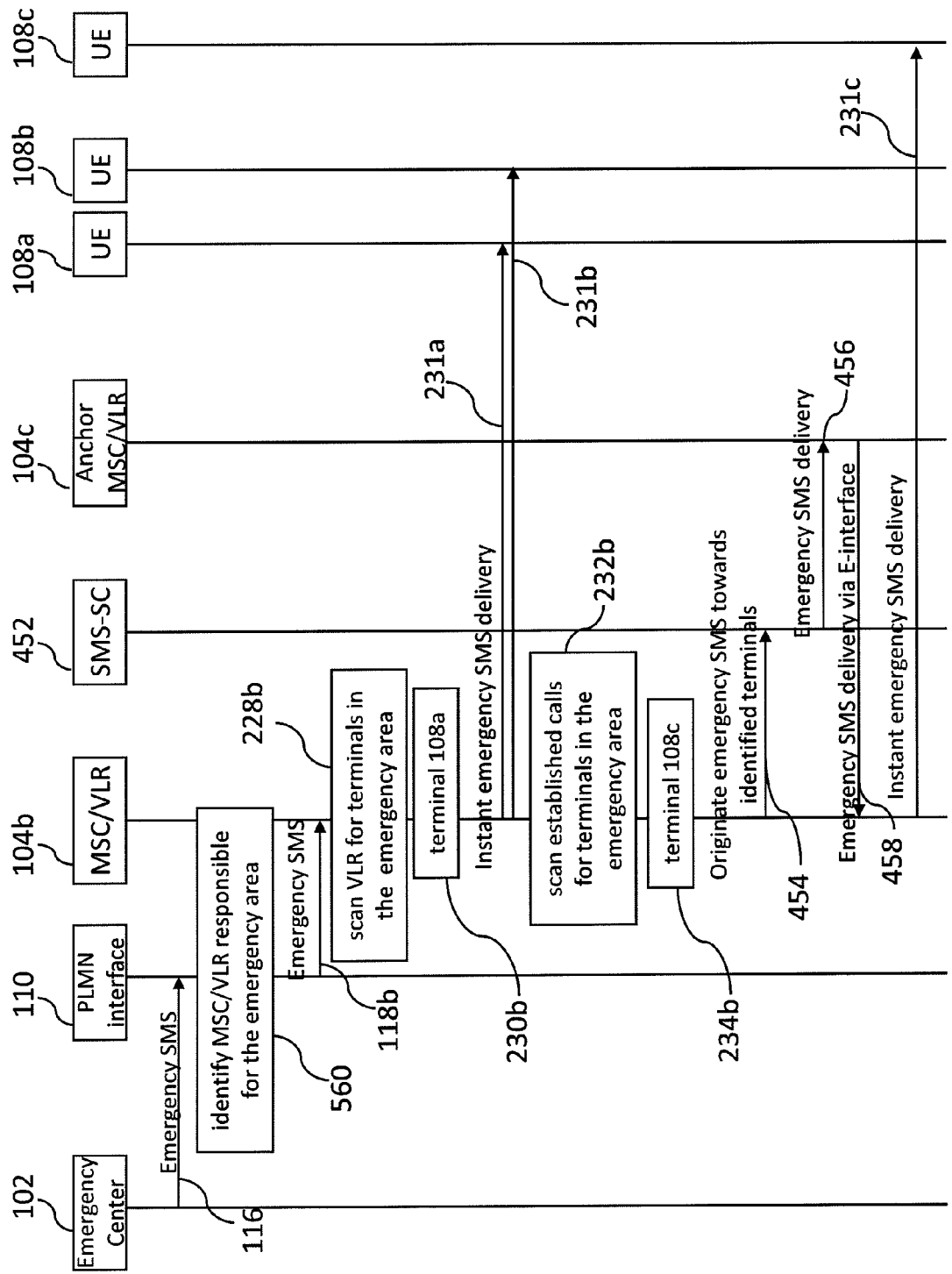
FIG. 5 is a flow diagram illustrating another method of notifying terminals located in an emergency area according to another exemplary embodiment of the invention.
Figure 6:
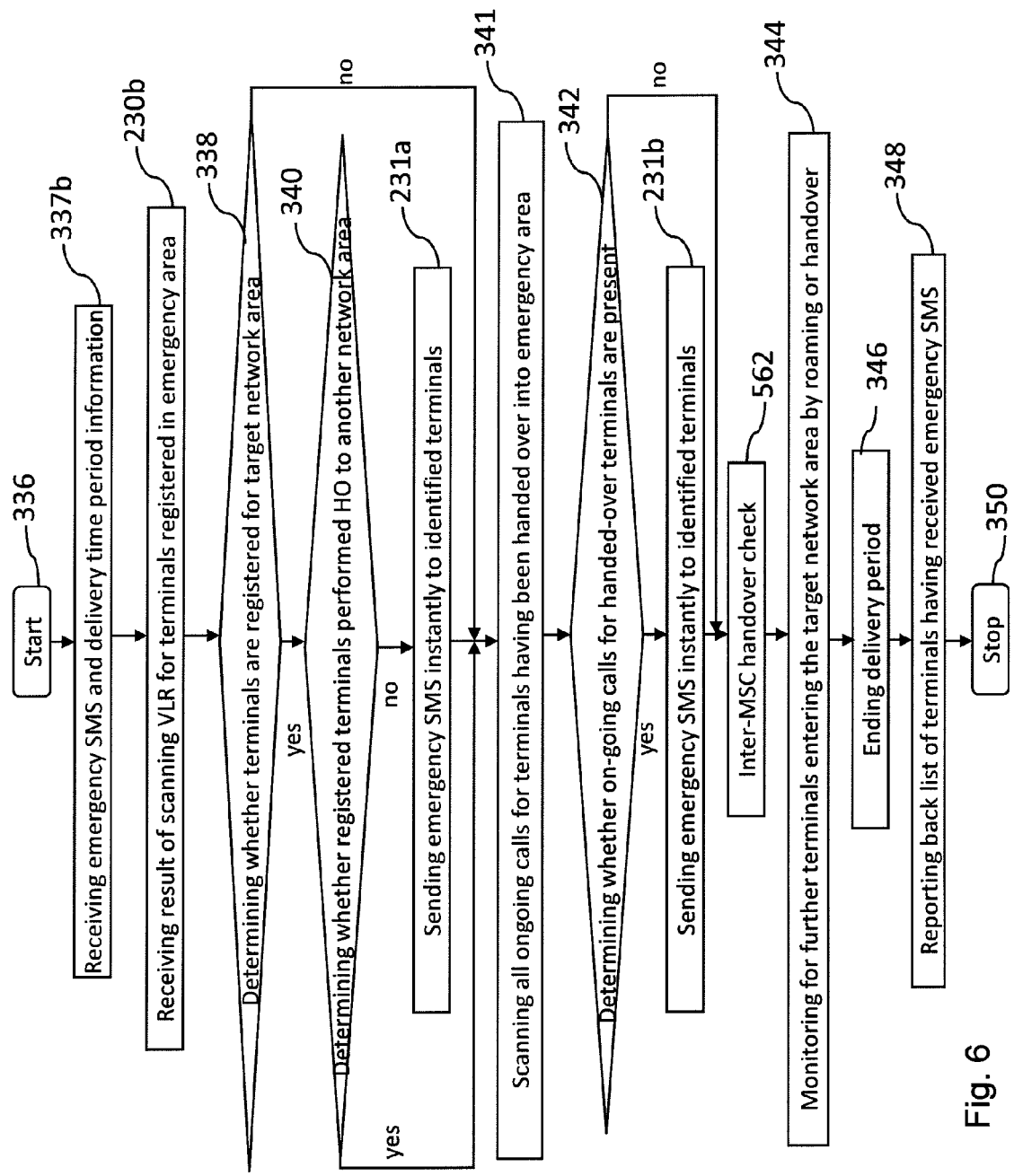
FIG. 6 is a flow diagram illustrating the method of notifying terminals located in the emergency area in FIG. 5 from a perspective of a MSC of the communication system in FIG. 4.
Figure 7:
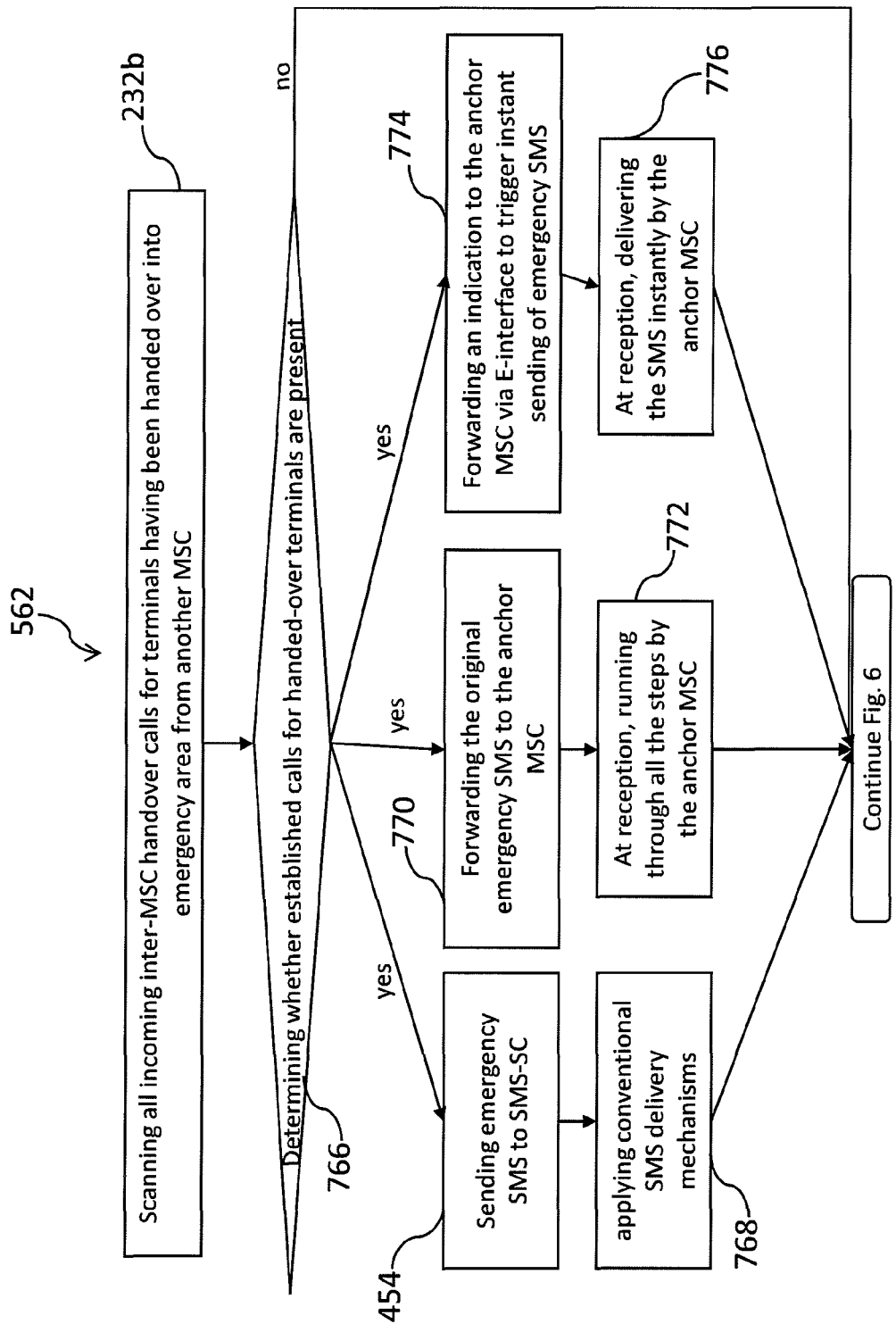
FIG. 7 is a flow diagram illustrating sub-steps of an inter-MSC handover check in FIG. 6.

Referring to FIGS. 5 to 7, a method of notifying the terminals 108a-c located in the emergency area 114 according to an exemplary embodiment of the invention will be explained in the following. FIG. 5 focuses on the intra-MSC handover case of the terminal 108c, FIG. 6 focuses on the inter-MSC handover case of the terminal 108b, and FIG. 7 illustrates a sequence of method steps of the intra-MSC handover check of the MSC 104b for identifying the terminal 108c. Similar to FIGS. 1 to 3, reference numerals assigned to the emergency SMS data transfer between the emergency center 102 and the terminals 108a-c will be used for referring to respective method steps of the method for ease of explanation.

After a sending of the emergency SMS from the emergency center 102 to the PLMN interface 110 in a step 116, the PLMN 110 identifies in a step 560 the MSC 104b responsible for the emergency area 114 as to call control management, mobility management, VLR record storage, and provision of the radio access. To this end, the PLMN interface 110 evaluates the mapping table comprising the entries for the MSCs assigned to the network areas of the communication system 400.

Next, the method proceeds for the MSC 104b as the method illustrated in FIG. 2.

After having identified the terminal 108c in a step 234b, the MSC 104b sends in a step 454 the emergency SMS to the SMS-SC 452 which accordingly relays the emergency SMS in a step 456 to the MSC 104c. The MSC 104c acts as the anchor MSC for the terminal 108c, and sends the emergency SMS in a step 458 back to the MSC 104b via the respective E-interface such that the MSC 104b instantly send in a step 231c the emergency SMS to the terminal 108c.

Next, each of the terminals 108a-c sends an acknowledgment indicating a receipt of the emergency SMS to the MSC 104b which in turn sends a logging report to the emergency center 102 comprising information about the IMSIs of the terminals 108a-c having received the emergency SMS.

At least two steps of the step 228b of the scanning of the VLR, the step of the scanning of the established calls for terminals having executed an inter-MSC handover, and the step 232b of the scanning of the established calls for terminals having executed an inter-MSC handover may be simultaneously executed.

Referring to FIG. 6, the method of FIG. 5 will be explained from the perspective of the MSC 104b in the following. The sequence of method steps of FIG. 6 is identical to the sequence of methods steps in FIG. 3. Further, a step 562 of an inter-MSC handover check will be executed between the steps 120 and 344. This step 562 is also executed in a case in which the determination of the step 342 is not in the affirmative.

Referring to FIG. 7, the step 562 will be explained in more detail. It is noted that part of the method steps are not executed by the MSC 104b. First, the MSC 104b scans in the step 232b all established, incoming inter-MSC handover calls for terminals having been handed over into the emergency area 114 from the another serving network area 114a, c, d associated with the another MSCs 104a, c, d. To this end, the MSC 104b evaluates handover related signaling traffic between the terminals having an established call and the MSC 104b. Next, in a step 766, the MSC 104b determines whether established calls for handed-over terminals are present. This is the case for the terminal 108c (step 234b).

Next, all possible options for notifying the terminal 108c will be explained although FIG. 5 all show a first option. Part of the illustrated method steps are not executed by the MSC 104b.

If the determination is in the affirmative, the MSC 104b sends, in the first option, the emergency SMS in the step 454 to the SMS-SC 452. In a step 768, conventional SMS delivery procedures are applied for the sending of the emergency SMS to the terminal 108b. This procedure may include the steps 456, 458 and 231c.

In a second option, the MSC 104b forwards in a step 770 the original emergency SMS to the MSC 104c via the E-interface which, at receipt of the emergency SMS, executes all steps as indicated in FIG. 6 prior to the inter-MSC handover check 586.

In a third option, the MSC 104b forwards in a step 774 an indication to the MSC 104c via the respective E-interface, in order to trigger the instant sending of the emergency SMS to the terminal 108c. Next, in a step 776, the MSC 104c generates the emergency SMS, and instantly delivers the emergency SMS back to the MSC 104b. This procedure is similar to the procedure associated with the steps 124, 231b described in FIG. 2.

After having executed the steps 768, 772, 776 and/or when the determination of the step 766 is not in the affirmative, the step 344 illustrated in FIG. 6 will be executed.

Again referring to FIG. 6, the MSC 104 evaluates in a step 346 that the delivery time period ends, since the timer set in the MSC 104b has expired. Next, in a step 348, the MSC 104b reports back the number of delivered emergency SMSs by evaluating the received acknowledgments of the terminals 108a-c. The method then stops in a step 350.

Figure 8:
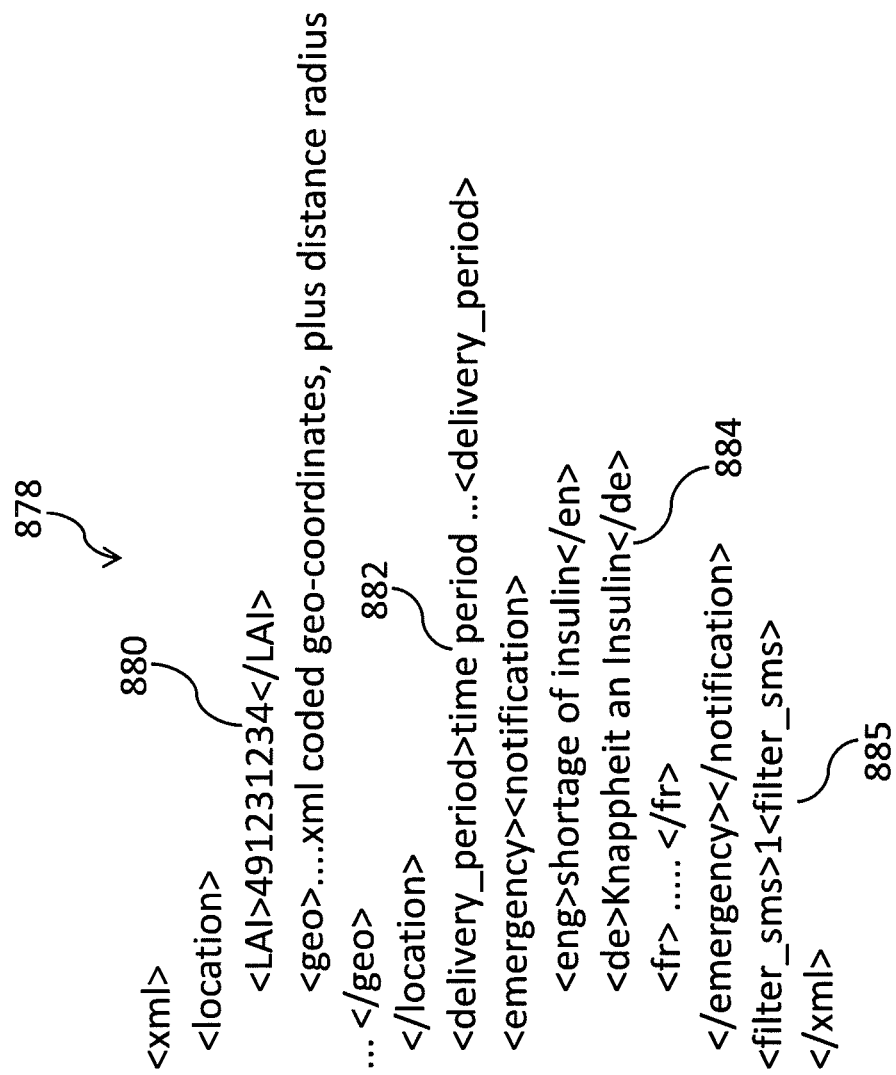
FIG. 8 illustrates a constitution of an emergency SMS usable in association with a method of notifying terminals located in an emergency area according to another exemplary embodiment of the invention.

Referring to FIG. 8, a composition of an emergency SMS 878 based on an Extensible Markup Language XML will be explained. The emergency SMS 878 is usable in association with a method of notifying terminals located in an emergency area according to another exemplary embodiment of the invention. The underlying communication system of this method may be identical to the communication system 100 or 400. The method comprises, in addition to the methods described with reference to FIGS. 1 to 3 and FIGS. 4 to 7, a step of filtering by the terminals 108a-c the emergency SMS upon receipt by the terminals 108a-c, in order to selectively provide the received emergency SMS to subscribers associated with the terminals 108a-c. For instance, if the emergency to be notified concerns a shortage of a particular medication, only subscribers of terminals 108a-c having a respective illness may be provided with the emergency SMS. Here, the involved subscribers have entered respective information into their user profile stored in the terminal.

The emergency SMS 878 comprises location area information 880 indicating the Location Area Identity of the terminal 108a-c. Further, the emergency SMS 878 comprises the time period information 882, for example ten days, and an emergency text string 884, here "shortage of insulin". The emergency text 884 comprises the language which is preferred by the subscriber of the terminal 108, and is selected according to the VLR record of the terminal 108. Alternatively, as illustrated in FIG. 8, the notification text 884 is sent in commonly used languages such as English, French, German, and the receiving terminal 108a-c selects the language according to preferences set by the subscriber for the terminal 108a-c.

Further, the emergency SMS 878 comprises filter information 885 configured as a flag indicating whether the emergency text 884 is to be displayed to the subscriber or the more subscribers of terminals 108a-c receiving the emergency SMS 878. In the shown embodiment, the flag comprises the value one indicating that the emergency SMS 878 is to be displayed by the terminal 108a-c to the subscribers. Alternatively, the flag may comprise a value zero indicating that the emergency SMS 878 is not to be displayed by the terminal 108a-c to the subscriber. Each of the terminals 108a-c receiving the emergency SMS 878 may comprise a respective filter mechanism to evaluate the flag.

Figure 9:
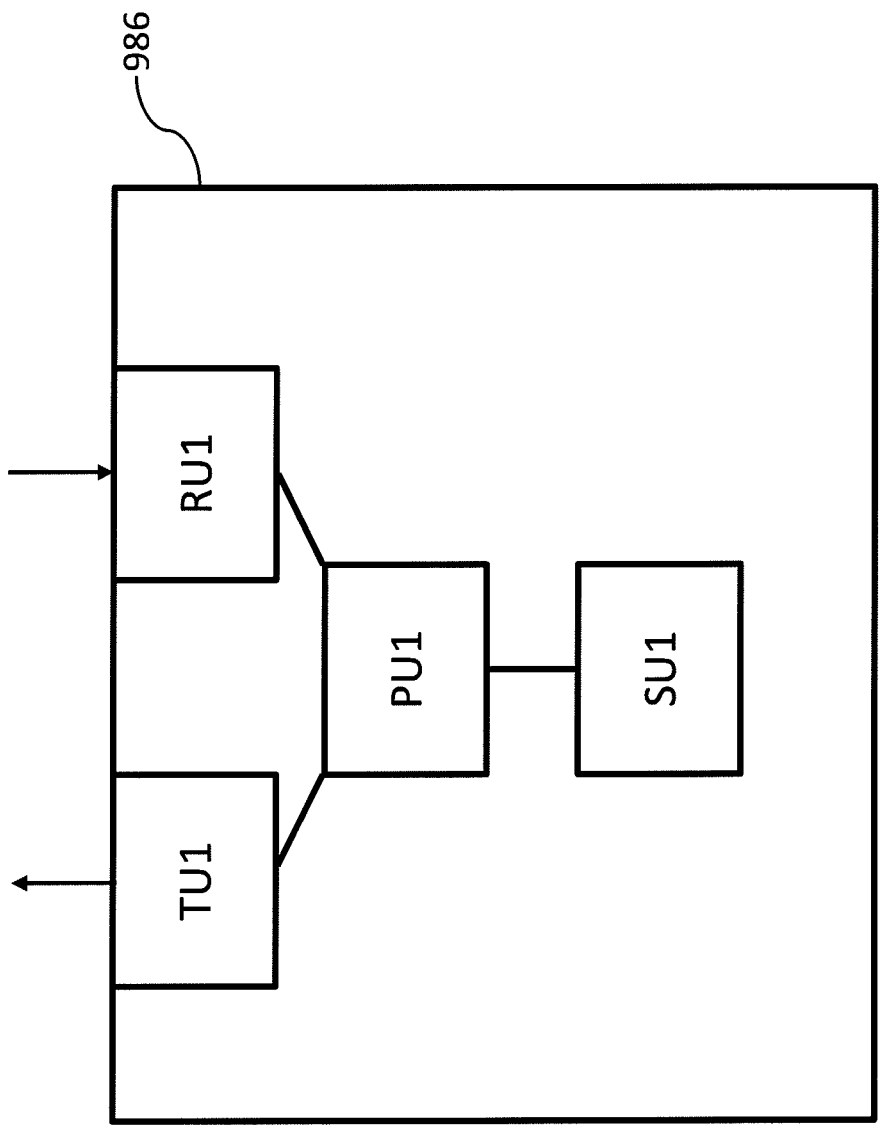
FIG. 9 is a block diagram illustrating a call control node according to an exemplary embodiment of the invention.

Referring to FIG. 9, a call control node 986 for notifying terminals located in a target network area according to an exemplary embodiment of the invention will be explained. The call control node 986 is associated with a serving network area, and the serving network area at least partially comprises the target network area. The call control node 986 comprises a receiving unit RU1 configured for receiving a result of a scanning of a visitor location register database associated with the call control node 986 for terminals registered in the target network area, and a sending unit TU1 configured for sending a notification message to the terminals located in the target network area based on the received result of the scanning. Further, the call control node 986 comprises a processing unit PU1 configured for processing information related to a method of notifying terminals in a target network area as described above. The call control node 986 also comprises a storage unit SU1 configured for storing information usable during such a method.

In particular, the call control node may be configured for executing the method of notifying terminals in a target network area as described above, and may comprise respective functionalities executed by one or more of the sending unit TU1, the receiving unit RU1, the processing unit PU1, and storage unit SU1. In particular, at least two of the sending unit TU1, the receiving unit RU1, the processing unit PU1, and the storage unit SU1 may be comprised in one unit.

The above described constitution of the call control node 986 similarly applies for the another call control node 104a, c, d, the terminal 108a-c, the E-interface, the PMNL-interface 110, and the SMS-SC 452.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A method executed by a call control node associated with a serving network area for notifying terminals located in a target network area, wherein the serving network area at least partially comprises the target network area, the method comprising:
    receiving a result of a scanning of a visitor location register database associated with the call control node for terminals registered for the target network area;
    based on the received result of the scanning, determining which of the registered terminals are actually located in the target network area and identifying terminals that are actually located in the target network area despite not being registered in the visitor location register database;
    during a delivery period, sending a notification message to each of the registered terminals that are determined to be actually located in the target network area and sending a notification message to each of the unregistered terminals identified as actually located in the target network area;
    monitoring for terminals that enter the target network area by roaming or by executing a handover during the delivery period; and
    sending a notification message to any of the terminals that enter the target network area before the end of the delivery period.

2. The method according to claim 1, further comprising determining whether one of the registered terminals has been handed-over from the target network area to another network area, and wherein said sending comprises sending the notification message to that registered terminal if the terminal has not been handed-over from the target network area to another network area.

3. The method according to claim 1, further comprising scanning established calls in the serving network area of the call control node for any terminal having been handed over into the target network area, and wherein said sending comprises sending the notification message based on a result of that scanning.

4. The method according to claim 3, wherein scanning established calls comprises scanning established calls in the serving network area of the call control node for any terminal having been handed over into the target network area from another network area in the serving network area of the call control node.

5. The method according to claim 3, wherein scanning established calls comprises scanning established calls in the serving network area of the call control node for terminals having been handed over into the target network area from another serving network area of another call control node.

6. The method according to claim 1, further comprising receiving the notification message from another call control node for the sending of the notification message to the terminals.

7. The method according to claim 6, wherein receiving the notification message from the another call control node comprises receiving the notification message from the another call control node in response to the another call control node receiving the notification message from a notification center node.

8. The method according to claim 6, further comprising sending request information to the another call control node, to an interface node located between the call control node and the another call control node, or to a notification message delivery node, wherein the request information indicates a request to generate the notification message, and wherein receiving the notification message from the another call control node comprises receiving the notification message from the another call control node in response to sending the request information.

9. The method according to claim 1, wherein said sending comprises sending the notification message to a notification message delivery node configured to send the notification message to the terminals.

10. The method according to claim 1, further comprising receiving the notification message from a notification center node for sending of the notification message to terminals located in the target area network; and reporting to the notification center at least one of a number of terminals having received a notification message.

11. The method according to claim 1, further comprising receiving from a notification center node time period information indicating the delivery period during which the notification message is to be sent to the terminals, and wherein said sending comprises sending the notification message within the indicated delivery period.

12. The method according to claim 1, wherein the notification message comprises:
location area information indicating a location area of a terminal; and
notification text information indicating a notification text to be provided to a terminal.

13. The method according to claim 1, wherein the notification message comprises: at least one of:
filter information to be used by a terminal for filtering the notification message to be provided to a subscriber associated with the terminal; and
time period information indicating the delivery period during which the notification message is to be sent to the terminal located in the target network area.

14. The method according to claim 1, wherein the notification message comprises information about an emergency, information about an advertisement, or service related information.

15. A call control node associated with a serving network area for notifying terminals located in a target network area, wherein the serving network area at least partially comprises the target network area, the call control node comprising:
a receiver configured to receive a result of a scanning of a visitor location register database associated with the call control node for terminals registered for the target network area;
a processing circuit configured to determine which of the registered terminals are actually located in the target network area and identify terminals that are actually located in the target network area despite not being registered in the visitor location register database;
a transmitter configured to, during the delivery period, send a notification message to each of the registered terminals that are determined to be actually located in the target network area and to send a notification message to each of the unregistered terminals identified as actually located in the target network area;
wherein the processing circuit is further configured to monitor for terminals that enter the target network area by roaming or by executing a handover during the delivery period; and
wherein the transmitter is further configured to send a notification message to any of the terminals that enter the target network area before the end of the delivery period.

16. The call control node according to claim 15, wherein the processing circuit is configured to determine whether one of the registered terminals has been handed-over from the target network area to another network area, and wherein the transmitter is configured to send the notification message to that registered terminal if the terminal has not been handed-over from the target network area to another network area.

17. The call control node according to claim 15, wherein the processing circuit is configured to scan established calls in the serving network area of the call control node for any terminal having been handed over into the target network area, and wherein the transmitter is configured to send the notification message based on a result of that scanning.

18. The call control node according to claim 17, wherein the processing circuit is configured to scan established calls in the serving network area of the call control node for any terminal having been handed over into the target network area from another network area in the serving network area of the call control node.

19. The call control node according to claim 17, wherein the processing circuit is configured to scan established calls in the serving network area of the call control node for terminals having been handed over into the target network area from another serving network area of another call control node.

20. The call control node of claim 15,
wherein the receiver is configured to receive the notification message from a notification center node for sending of the notification message to terminals located in the target area network; and
wherein the transmitter is configured to report to the notification center at least one of a number of terminals having received a notification message.

21. A computer program product stored on a non-transitory computer-readable medium and comprising computer program instructions that, when executed by a processor associated with a call control node, cause the call control node to notify terminals located in a target network area, wherein the call control node is associated with a serving network area that at least partially comprises the target network area, the computer program instructions causing the call control node to:
receive a result of a scanning of a visitor location register database associated with the call control node for terminals registered for the target network area;
based on the received result of the scanning, determine which of the registered terminals are actually located in the target network area and identifying terminals that are actually located in the target network area despite not being registered in the visitor location register database;
during a delivery period, send a notification message to each of the registered terminals that are determined to be actually located in the target network area; and send a notification message to each of the unregistered terminals identified as actually located in the target network area;
monitor for terminals that enter the target network area by roaming or by executing a handover during the delivery period; and send a notification message to any of the terminals that enter the target network area before the end of the delivery period.

* * * * *

UNITED STATES PATENT AND TRADEMARK OFFICE
CERTIFICATE OF CORRECTION

PATENT NO. : 9,155,113 B2
APPLICATION NO. : 13/416726
DATED : October 6, 2015
INVENTOR(S) : Witzel Page 1 of 1

It is certified that error appears in the above-identified patent and that said Letters Patent is hereby corrected as shown below:

On the Title Page, in Item (60), under "Related U.S. Application Data", in Column 1, Lines 1-2, delete "Mar. 11, 2011." and insert -- Mar. 17, 2011. --, therefor.

Signed and Sealed this
Eighth Day of March, 2016

Michelle K. Lee
*Director of the United States Patent and Trademark Office*